United States Patent
Ghoreishi et al.

(10) Patent No.: US 7,654,487 B2
(45) Date of Patent: Feb. 2, 2010

(54) VENT BAFFLE

(75) Inventors: Mostafa Ghoreishi, Bellevue, WA (US); Anthony Anderson, Snohomish, WA (US)

(73) Assignee: The Boeing Company, Chicago, IL (US)

(*) Notice: Subject to any disclaimer, the term of this patent is extended or adjusted under 35 U.S.C. 154(b) by 277 days.

(21) Appl. No.: 11/753,916

(22) Filed: May 25, 2007

(65) Prior Publication Data

US 2008/0290217 A1 Nov. 27, 2008

(51) Int. Cl.
*B64D 25/00* (2006.01)
*B64C 1/14* (2006.01)

(52) U.S. Cl. .................. 244/118.5; 244/129.4

(58) Field of Classification Search ........... 244/118.5, 244/1 R, 129.1, 129.4, 129.5; 454/70, 71
See application file for complete search history.

(56) References Cited

U.S. PATENT DOCUMENTS

| | | | |
|---|---|---|---|
| 4,383,666 A * | 5/1983 | Allerding et al. ......... | 244/118.5 |
| 4,432,514 A * | 2/1984 | Brandon ................ | 244/118.5 |
| 4,646,993 A * | 3/1987 | Baetke ................ | 244/117 R |
| 4,819,548 A * | 4/1989 | Horstman .............. | 454/76 |
| 4,899,960 A * | 2/1990 | Hararat-Tehrani et al. ................ | 244/118.5 |
| 5,118,053 A | 6/1992 | Singh et al. | |
| 5,137,231 A | 8/1992 | Boss | |
| 5,452,913 A | 9/1995 | Hansen et al. | |
| 5,871,178 A * | 2/1999 | Barnett et al. ........... | 244/118.5 |
| 6,129,312 A * | 10/2000 | Weber ................ | 244/118.5 |
| 6,264,141 B1 * | 7/2001 | Shim et al. ............. | 244/118.5 |
| 6,435,455 B1 * | 8/2002 | Holman et al. .......... | 244/118.5 |
| 7,007,892 B2 | 3/2006 | Tubbs | |
| 7,032,863 B1 | 4/2006 | Piorkowski et al. | |

* cited by examiner

*Primary Examiner*—Tien Dinh
(74) *Attorney, Agent, or Firm*—Tung & Associates

(57) ABSTRACT

A vent baffle includes a vent panel having a vent panel opening; a blowout panel carried by the vent panel and covering the vent panel opening; a plurality of fastener openings provided in the blowout panel; a plurality of tear slits communicating with the plurality of fastener openings, respectively; and a plurality of panel fasteners extending through the plurality of fastener openings, respectively, and engaging the blowout panel.

20 Claims, 2 Drawing Sheets

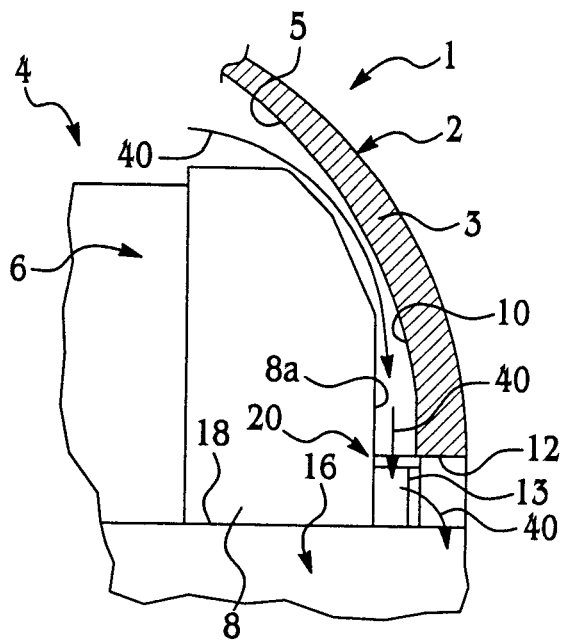
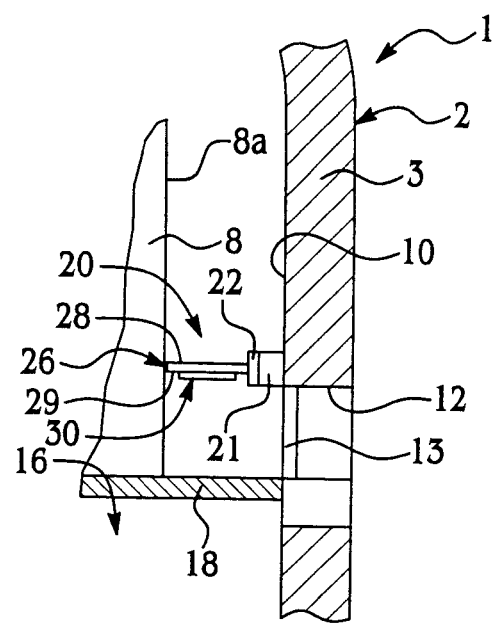
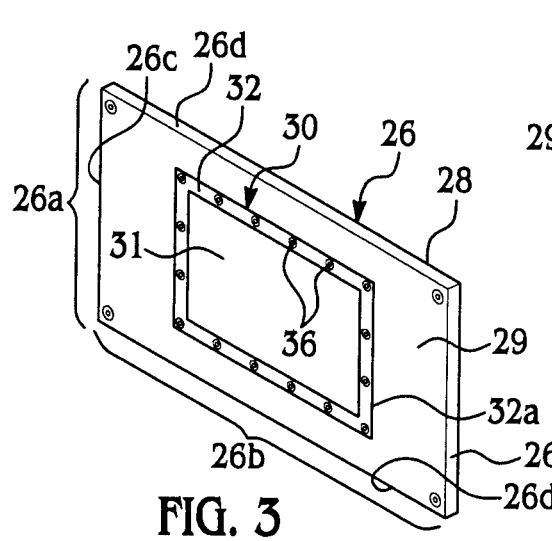
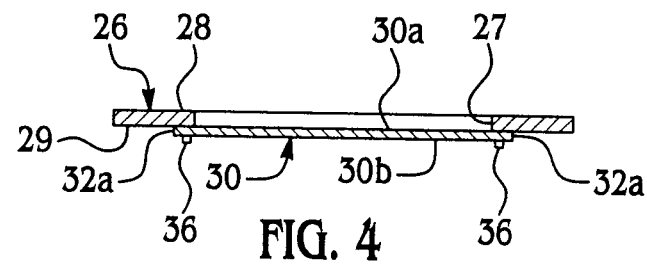
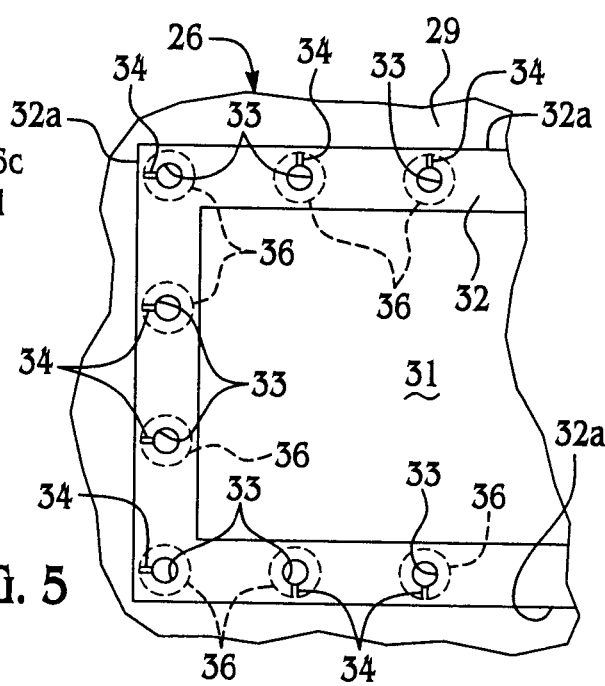
FIG. 1
FIG. 2
FIG. 3
FIG. 4
FIG. 5

VENT BAFFLE

FIELD

The present disclosure relates to vent baffles. More particularly, the present disclosure relates to a vent baffle which in one application is capable of opening in the event of a decompression event or positive pressure event to establish flow of air between a cabin and a cargo area of an aircraft.

BACKGROUND

In passenger aircraft, sidewall monuments, otherwise known as structures such as closets, video control stations, lavatories and the like, are provided between the aircraft cabin or passenger compartment and the sidewall of the aircraft. At periodic spacings along the aircraft fuselage, vent openings and return air grilles are provided in the sidewall to establish flow of air from the cabin, along an air flow path adjacent to the sidewall and to the lower portion or cargo hold of the aircraft in the event of a decompression event in the lower portion. While it is desirable to facilitate the rapid flow of air between the lower portion and the passenger compartment of an aircraft, it is also desirable that the passage of air between such compartments may be obstructed when necessary.

SUMMARY

The present disclosure is generally directed to a vent baffle. An illustrative embodiment of the vent baffle includes a vent panel having a vent panel opening; a blowout panel carried by the vent panel and covering the vent panel opening; a plurality of fastener openings provided in the blowout panel; a plurality of tear slits communicating with the plurality of fastener openings, respectively; and a plurality of panel fasteners extending through the plurality of fastener openings, respectively, and engaging the blowout panel.

The present disclosure is further generally directed to a vent baffle system for an aircraft. An illustrative embodiment of the vent baffle system includes an aircraft fuselage having an aircraft sidewall, an upper portion and a lower portion defined by the aircraft sidewall, a sidewall monument or structure provided in the upper portion, an air flow path between the sidewall monument or structure and the aircraft sidewall and a vent opening provided in the aircraft sidewall and establishing communication between the upper portion and the lower portion; and a vent baffle having a vent panel provided in the air flow path, a vent panel opening provided in the vent panel and a blowout panel provided on the vent panel and covering the vent panel opening.

The present disclosure is further generally directed to a method of venting an air flow path between a sidewall monument or structure and an aircraft sidewall in an aircraft fuselage of an aircraft. An illustrative embodiment of the method includes providing a vent baffle in the air flow path. The vent baffle includes a vent panel, a vent panel opening provided in the vent panel and a blowout panel provided on the vent panel and covering the vent panel opening.

BRIEF DESCRIPTION OF THE DRAWINGS

The disclosure will now be made, by way of example, with reference to the accompanying drawings, in which:

FIG. 1 is a sectional view of a portion of an aircraft fuselage, more particularly illustrating a sidewall monument or structure in an upper portion of the fuselage, an air flow path between the sidewall monument or structure and aircraft sidewall and an illustrative embodiment of the vent baffle provided in the air flow path.

FIG. 2 is a partial sectional view of the sidewall monument or structure, the sidewall of the aircraft fuselage and the air flow path between the sidewall monument or structure and the sidewall, more particularly illustrating an illustrative embodiment of the vent baffle provided in the air flow path, with the vent baffle shown in an intact configuration.

FIG. 3 is a bottom perspective view of a vent panel and blowout panel components of an illustrative embodiment of the vent baffle.

FIG. 4 is a transverse sectional view of the vent panel and blowout panel.

FIG. 5 is a bottom view, partially in section, of the vent panel and blowout panel, more particularly illustrating multiple fastener openings provided in the blowout panel, a slit communicating with each fastener opening and a fastener (shown in phantom) extending through each fastener opening and attaching the blowout panel to the vent panel.

DETAILED DESCRIPTION

Figure 6:
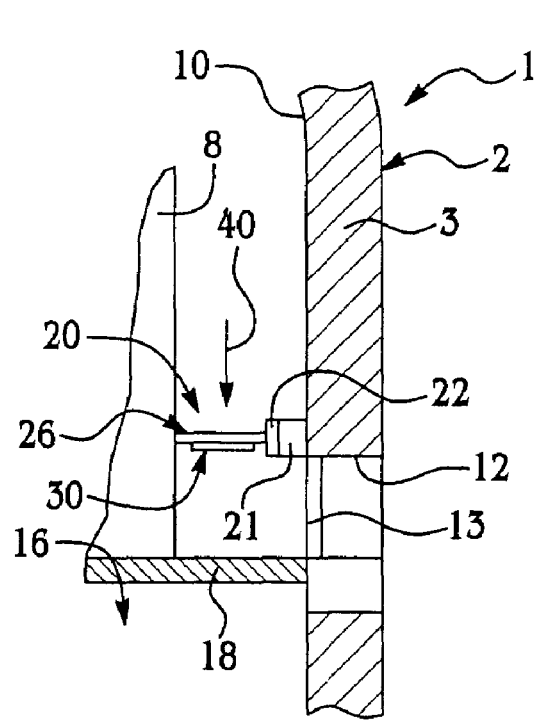
FIG. 6 is a partial sectional view of the sidewall monument or structure, the sidewall of the aircraft fuselage and the air flow path between the sidewall monument or structure and the sidewall, with an illustrative embodiment of the vent baffle provided in the air flow path, more particularly illustrating a normal flow of air against the vent baffle with the vent baffle shown in an intact configuration.

According to recent aircraft design requirements, sidewall monuments or structures are required to provide an air flow path from the cabin or crown of the aircraft to the lower portion which is equal to a minimum area of 41 square inches per return air grille blocked by the sidewall monument or structure. The air flow path is typically over the top and then outboard of the sidewall monument or structure and inboard of the sidewall liner. A blow-away vent baffle is further required in the air flow path to establish air flow from the lower portion to the cabin in the event of a positive pressure event in the lower portion. The vent baffle is required to remain closed when exposed to a pressure differential of 0.25 psid and deploy to a fully-open position within 0.050 seconds during a lower portion decompression event which forms a pressure differential between 0.25 psid and 0.50 psid. The vent baffle is also required to remain closed when exposed to a pressure differential of 0.10 psid from below.

The vent baffle is required to stay closed when exposed to a pressure differential of 0.10 psid (sustained for 60 seconds) from above. The vent baffle is also required to stay closed when exposed to a pressure differential of 0.10 psid (sustained for 60 seconds) from below. The vent baffle is required to begin to deploy during a lower portion decompression event at less than or equal to 0.60 psid pressure differential. The vent baffle is also required to be fully open within 0.025 seconds or less from the time it begins to open.

Referring initially to the drawings, an illustrative embodiment of the vent baffle is generally indicated by reference numeral 20 in FIGS. 1 and 2. The vent baffle 20 is suitable for use in a passenger aircraft 1 having an aircraft fuselage 2. The aircraft fuselage 2 has an aircraft sidewall 3. As shown in FIG. 1, an upper portion 4 in the aircraft fuselage 2 typically includes a crown 5 and a passenger cabin 6 beneath the crown 5. A floor 18 separates the upper portion 4 from a lower portion 16 in the aircraft fuselage 2.

A sidewall monument or structure 8, which may be a closet, video control station, lavatory or the like, is provided on the floor 18 between the passenger cabin 6 and the aircraft sidewall 3. An air flow path 10 is defined between the top and a rear surface 8a of the sidewall monument or structure 8 and the aircraft sidewall 3. A vent opening 12 is provided in the aircraft sidewall 3 and establishes communication between the air flow path 10 and the lower portion 16 of the aircraft fuselage 2. A return air grille 13 is typically provided over the vent opening 12.

As shown in FIG. 2, an illustrative embodiment of the vent baffle 20 includes a vent baffle support 21 which is mounted on the aircraft sidewall 3 of the aircraft fuselage 2. The vent baffle support 21 may be attached to the aircraft sidewall 3 using welding, mechanical fasteners and/or any other suitable attachment technique which is known to those skilled in the art. A support bracket 22 is typically provided on the vent baffle support 21.

A vent panel 26, which typically has a generally elongated, rectangular configuration, is attached to the support bracket 22 using welding, mechanical fasteners (not illustrated) and/or other suitable alternative technique which is known to those skilled in the art. As shown in FIG. 3, the width 26a of the vent panel 26 generally corresponds to the distance between the support bracket 22 and the rear surface 8a of the sidewall monument or structure 8. The length 26b of the vent panel 26 generally corresponds to the width of the sidewall monument or structure 8. The vent panel 26 has a first panel surface 28, a second panel surface 29, a pair of transverse panel edges 26c each of which corresponds to the width 26a of the vent panel 26 and a pair of longitudinal panel edges 26d each of which corresponds to the length 26b of the vent panel 26.

As shown in FIG. 4, a vent panel opening 27 extends through the vent panel 26 and establishes communication between the first panel surface 28 and the second panel surface 29. In some embodiments, the vent panel opening 27 has a generally elongated, rectangular configuration. A blowout panel 30 is attached to the second panel surface 29 of the vent panel 26 typically in a manner which will be hereinafter described. The blowout panel 30 is fabricated of a pliable material such as plastic, rubber or foam rubber, for example, and covers the vent panel opening 27 in the vent panel 26.

As shown in FIGS. 3 and 5, in some embodiments the blowout panel 30 includes a panel body 31 and a panel frame 32 which extends along the perimeter of the panel body 31. The panel frame 32 has a blowout panel edge 32a. Multiple fastener openings 33 extend through the panel frame 32 in spaced-apart relationship with respect to each other. In some embodiments, a tear slit 34 communicates with each fastener opening 33 and extends through the panel frame 32, toward the blowout panel edge 32a. Multiple panel fasteners 36 extend through the respective fastener openings 33 and are threaded or otherwise secured in respective fastener openings (not shown) provided in the second panel surface 29 of the vent panel 26. Accordingly, the panel fasteners 36 secure the blowout panel 30 to the second panel surface 29 of the vent panel 26 such that the blowout panel 30 covers and seals the vent panel opening 27. As shown in FIG. 4, the blowout panel 30 has a first panel surface 30a which corresponds to the first panel surface 28 of the vent panel 26 and faces the vent panel opening 27 in the vent panel 26. The blowout panel 30 also has a second panel surface 30b which is opposite the first panel surface 30a and corresponds to the second panel surface 29 of the vent panel 26.

In typical application, the vent baffle 20 is constructed in such a manner that the blowout panel 30 remains attached to the second panel surface 29 of the vent panel 26 when the blowout panel 30 is exposed to a pressure differential of 0.25 psid and detaches from the second panel surface 29 to fully open the vent panel opening 27 within 0.050 seconds upon formation of a pressure differential of between 0.25 psid and 0.50 psid, with the higher pressure applied to the first panel surface 28 side of the blowout panel 30. The blowout panel 30 also remains attached to the second panel surface 29 when exposed to a pressure differential of 0.10 psid, with the higher pressure applied to the second panel surface 29 side of the blowout panel 30.

As shown in FIG. 2, the vent panel 26 is mounted in the air flow path 10 typically by attaching one longitudinal panel edge 26d of the vent panel 26 to the support bracket 22 using welding, fasteners (not shown) and/or other techniques known to those skilled in the art. The opposite longitudinal panel edge 26d of the vent panel 26 is attached to the rear surface 8a of the sidewall monument or structure 8 using welding, fasteners (not shown) and/or other techniques known to those skilled in the art. A support bracket (not shown) may be provided on the rear surface 8a of the sidewall monument or structure 8 and attached to the vent panel 26 to facilitate attachment of the vent panel 26 to the sidewall monument or structure 8, according to the knowledge of those skilled in the art. When the vent panel 26 is mounted in the air flow path 10, as shown in FIG. 2, the first panel surface 28 of the vent panel 26 is typically oriented generally upwardly whereas the second panel surface 29, to which the blowout panel 30 is attached, is typically oriented generally downwardly. Likewise, the first panel surface 30a of the blowout panel 30 is typically oriented generally upwardly whereas the second panel surface 30b of the blowout panel 30 is typically oriented generally downwardly. It is to be understood, however, that in some applications the orientation of the vent baffle 20 in the air flow path 10 may be reversed.

During operation of the aircraft 1, the pressure of air in the lower portion 16 is maintained at a lower level than the pressure of air in the upper portion 4. Accordingly, as shown in FIGS. 1 and 6, air 40 flows from the passenger cabin 6, through the air flow path 10 and normally impinges against the first panel surface 28 of the vent panel 26 and the first panel surface 30a (FIG. 4) of the blowout panel 30 with a constant static pressure of up to typically about 0.25 psid. Accordingly, under normal pressure conditions in the aircraft fuselage 2, the air 40 is incapable of flowing from the upper portion 4 to the lower portion 16 through the vent opening 12 and return air grille 13 provided in the aircraft sidewall 3 of the aircraft fuselage 2 since the vent panel opening 27 in the vent panel 26 remains blocked by the blowout panel 30, as shown in FIG. 4.

Figure 7:
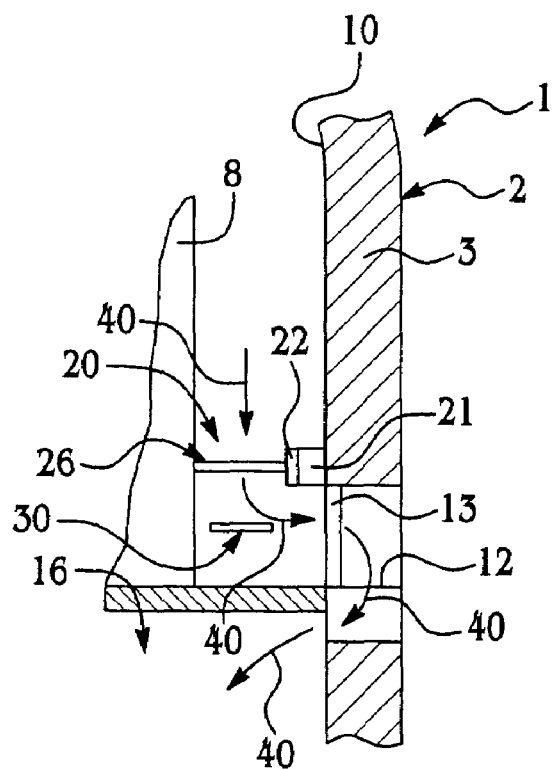
FIG. 7 is a partial sectional view of the sidewall monument or structure, the sidewall of the aircraft fuselage and the air flow path between the sidewall monument or structure and the sidewall, with an illustrative embodiment of the vent baffle provided in the air flow path, more particularly illustrating breaking away of the blowout panel from the vent panel in the event of a decompression event in the lower portion of the aircraft.
Figure 8:
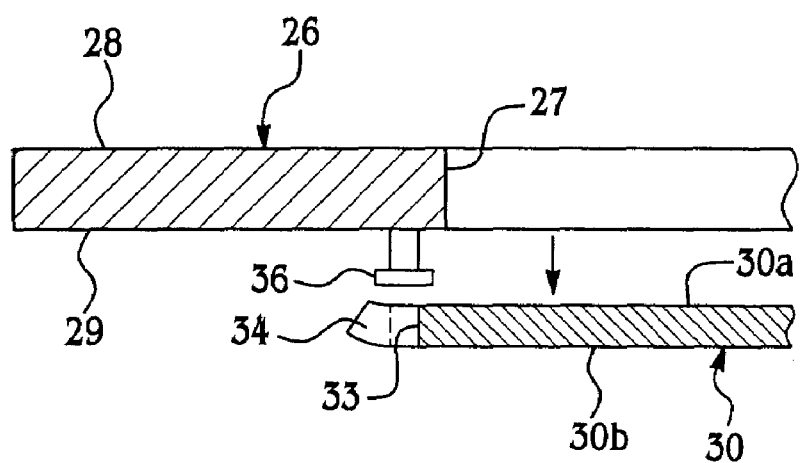
FIG. 8 is an exploded sectional view illustrating breaking away of the blowout panel from the vent panel in the event of decompression event in the lower portion of the aircraft.

The blowout panel 30 remains intact on the vent panel 26 as long as the pressure differential between the upper portion 4 and the lower portion 16 of the aircraft fuselage 3 remains within normal levels (typically up to about 0.25 psid of air pressure applied to the first panel surface 30a of the blowout panel 30). In the event of a decompression event in the lower portion 16, however, the air pressure in the lower portion 16 drops rapidly and the pressure differential across the vent baffle 20 sharply increases from typically about 0.25 psid to about 0.50 psid. Accordingly, the downward pressure of the air 40 is applied through the vent panel opening 27 in the vent panel 26, against the first panel surface 30a of the blowout panel 30 with a magnitude which tears the panel fasteners 36 from the fastener openings 33, through the respective tear slits 34 (FIG. 5) to the blowout panel edges 32a of the blowout panel 30, as shown in FIG. 8, as the panel fasteners 36 typically remain attached to the vent panel 26. Therefore, as shown in FIG. 7, the blowout panel 30 detaches from the vent panel 26 the vent panel opening 27 is opened within typically about 0.050 seconds after onset of the lower portion decompression event. The air 40 is therefore capable of flowing from the air flow path 10, through the open vent panel opening 27 of the vent panel 26 and to the lower portion 16 through the vent opening 12 and return air grille 13 provided in the aircraft sidewall 3, as further shown in FIG. 7.

In the event of a positive pressure event in the lower portion 16, air flows from the lower portion 16, through the vent opening 12 and return air grille 13 and into the air flow path 10, respectively. The air impinges against the second panel surface 30b of the blowout panel 30, which remains attached to the vent panel 26 and closes the vent panel opening 27 at constant static pressures of up to typically about 0.10 psid applied to the second panel surface 30b. In the event that the pressure of the air applied to the second panel surface 30b exceeds about 0.10 psid, the blowout panel 30 detaches from the panel fasteners 36 as the panel fasteners 36 tear from the fastener openings 33, through the respective tear slits 34 (FIG. 5) to the blowout panel edges 32a of the blowout panel 30. This exposes and opens the vent panel opening 27 in the vent panel 26, facilitating flow of air from the lower portion 16 and through the vent opening 12, the return air grille 13, the open vent panel opening 27 in the vent panel 26 and the air flow path 10 to the upper portion 4, respectively.

Although this disclosure includes certain exemplary embodiments, it is to be understood that the specific embodiments are for purposes of illustration and not limitation, as other variations will occur to those of ordinary skill in the art.

What is claimed is:

1. A vent baffle, comprising:
   a vent panel having a vent panel opening;
   a blowout panel carried by said vent panel and fully covering said vent panel opening to fully block air flow through said vent panel;
   a plurality of fastener openings provided in said blowout panel;
   a plurality of tear slits communicating with said plurality of fastener openings, respectively; and
   a plurality of panel fasteners extending through said plurality of fastener openings, respectively, and engaging said blowout panel, said plurality of fastener openings each comprising a tear slit extending toward an edge of said blowout panel.

2. The vent baffle of claim 1 wherein said blowout panel comprises a panel body and a panel frame provided on said panel body, and wherein said plurality of fastener openings and said plurality of tear slits extends through said panel frame.

3. The vent baffle of claim 1 wherein said vent panel has a pair of longitudinal edges and a pair of transverse edges.

4. The vent baffle of claim 1 further comprising a support bracket and wherein said vent panel is carried by said support bracket.

5. The vent baffle of claim 4 further comprising a vent baffle support and wherein said support bracket is carried by said vent baffle support.

6. The vent baffle of claim 1 wherein said vent panel opening has a generally elongated, rectangular configuration.

7. The vent baffle of claim 1, wherein each fastener opening comprises a single tear slit.

8. The vent baffle of claim 1, wherein said vent panel is disposed in an air flow path between a sidewall structure in an aircraft fuselage establishing communication between an upper portion and a lower portion of said aircraft fuselage.

9. A vent baffle system for an aircraft, comprising:
   an aircraft fuselage having an aircraft sidewall, an upper portion and a lower portion, a sidewall structure provided in said upper portion, an air flow path between said sidewall structure and said aircraft sidewall and a vent opening provided in said aircraft sidewall and establishing communication between said upper portion and said lower portion;
   a vent baffle having a vent panel provided in said air flow path, a vent panel opening provided in said vent panel and a blowout panel provided on said vent panel and fully covering said vent panel opening, said vent baffle and said blowout panel fully blocking air flow through said vent baffle; and,
   a plurality of fastener openings in said blowout panel and a plurality of panel fasteners extending through said plurality of fastener openings, respectively, and engaging said vent panel, said plurality of fastener openings each comprising a tear slit extending toward an edge of said blowout panel.

10. The vent baffle of claim 9, further comprising a vent baffle support carried by said aircraft sidewall and a support bracket carried by said vent baffle support, and wherein said vent panel is carried by said support bracket.

11. The vent baffle of claim 9, wherein said vent panel opening has a generally elongated, rectangular configuration.

12. The vent baffle of claim 9 wherein said vent panel comprises a first panel surface and a second panel surface and wherein said vent panel opening establishes communication between said first panel surface and said second panel surface, and wherein said blowout panel is provided on said second panel surface of said vent panel.

13. The vent baffle of claim 9, wherein each fastener opening comprises a single tear slit.

14. The vent baffle of claim 9, wherein said blowout panel is adapted to fully disengage from said vent panel upon a decompression event in said aircraft fuselage.

15. A method of venting an air flow path between a sidewall monument or structure and an aircraft sidewall in an aircraft fuselage, comprising:
   providing a vent baffle in said air flow path;
   wherein said vent baffle comprises a vent panel, a vent panel opening provided in said vent panel and a blowout panel provided on said vent panel and fully covering said vent panel opening, said vent baffle fully blocking said air flow path through said vent baffle;
   wherein a plurality of fastener openings are provided in said blowout panel and a plurality of panel fasteners provided extending through said plurality of fastener openings, respectively, and engaging said vent panel, said plurality of fastener openings each comprising a tear slit extending toward an edge of said blowout panel.

16. The method of claim 15 wherein said providing a vent baffle in said air flow path comprises providing a vent baffle support on said aircraft sidewall, providing a support bracket on said vent baffle support and attaching said vent panel to said support bracket.

17. The method of claim 15 wherein said vent panel comprises a first panel surface and a second panel surface and wherein said vent panel opening establishes communication between said first panel surface and said second panel surface, and wherein said blowout panel is provided on said second panel surface of said vent panel.

18. The method of claim 15, wherein each fastener opening comprises a single tear slit.

19. The vent baffle of claim 18, wherein said blowout panel is adapted to fully disengage from said vent panel upon a decompression event in said aircraft fuselage.

20. The method of claim 15, wherein said blowout panel fully disengages from said vent panel to open said air flow path upon a decompression event in said aircraft fuselage.

* * * * *